United States Patent
Yoshika et al.

(10) Patent No.: US 8,061,316 B2
(45) Date of Patent: Nov. 22, 2011

(54) INTERNAL COMBUSTION ENGINE

(75) Inventors: Daisuke Yoshika, Okazaki (JP); Shinichi Murata, Okazaki (JP); Hitoshi Toda, Okazaki (JP); Masayuki Takagaki, Aichi (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 147 days.

(21) Appl. No.: 12/558,119

(22) Filed: Sep. 11, 2009

(65) Prior Publication Data
US 2010/0064993 A1 Mar. 18, 2010

(30) Foreign Application Priority Data
Sep. 12, 2008 (JP) ................ P2008-235030

(51) Int. Cl.
*F01L 1/34* (2006.01)
(52) U.S. Cl. ............ 123/90.16; 123/90.15; 123/90.39; 123/90.44; 74/569
(58) Field of Classification Search ............ 123/90.15, 123/90.16, 90.17, 90.18, 345, 346, 90.39, 123/90.44; 74/559, 567, 569
See application file for complete search history.

(56) References Cited

U.S. PATENT DOCUMENTS
6,837,040 B2 * 1/2005 Sonoda et al. ............ 60/284
2006/0236960 A1 10/2006 Nakamura et al.

FOREIGN PATENT DOCUMENTS
| JP | 2003-129812 A | 5/2003 |
| JP | 2004-353501 A | 12/2004 |
| JP | 2005-127230 A | 5/2005 |
| JP | 2006-348774 A | 12/2006 |

* cited by examiner

Primary Examiner — Ching Chang
(74) Attorney, Agent, or Firm — Birch, Stewart, Kolasch & Birch, LLP

(57) ABSTRACT

An internal combustion engine includes: a variable valve train mechanism, configured to receive a cam displacement of an inlet cam so as to vary a driving output for driving an inlet valve continuously from a maximum valve lift to a minimum valve lift so as to match the driving output with a running condition of the internal combustion engine; and a control part, configured to control the variable valve train mechanism so as to set a valve lift of the inlet valve to a starter valve lift when starting the internal combustion engine in a cold state. The starter valve lift is formed so that a valve opening period of the inlet valve is set to encompass an overall area of an induction stroke period of the internal combustion engine from a top dead center to a bottom dead center of the induction stroke period.

8 Claims, 6 Drawing Sheets

INTERNAL COMBUSTION ENGINE

BACKGROUND

1. Field of the Invention

The present invention relates to an internal combustion engine in which the valve characteristics of an inlet valve are made variable by the use of a variable valve train.

2. Description of the Related Art

A good startability is required for a reciprocating engine (internal combustion engine) which is mounted on a motor vehicle (a vehicle). In particular, a high startability is required for a cold engine in which fuel is difficult to vaporize.

On the other hand, there is an engine disclosed in JP-A-2003-129812 in which a variable valve train of a variable valve lift type is mounted on a cylinder head for variably controlling the valve characteristics of an inlet valve so as to match them with a running condition of the engine in which variable valve train a valve lift of the inlet valve is made to vary continuously from a maximum valve lift to a minimum valve lift based on a maximum lift center position with a valve opening period narrowed.

Specifically, according to the varying function of the variable valve train, as is indicated by chain double-dashed lines in FIG. 10, the valve lift of the inlet valve varies continuously towards the small valve lift based on the maximum lift center position thereof with the valve opening period narrowed.

Because of this, in determining a starter valve lift, a method is used in which initially, a fast idle valve lift suitable for fast idle when the engine is in a cold state, or specifically, a large valve lift α is determined which large valve lift α is determined in a wide valve opening period extending from a point near a top dead center to an area spreading further than a bottom dead center of an induction stroke period, and based on this large valve lift α, a starter valve lift β for use for a cold start is then determined. Namely, the valve lift amount is reduced based on the maximum lift center position from the valve lift α so as to set the small starter valve lift β. Specifically, to ensure an actual compression ratio, the small starter valve lift β is set by a lift curve in which a valve closing position of the inlet valve is disposed near the bottom dead center of the induction stroke period. Fuel is made easy to vaporize for a cold start of the engine by this lift curve (by a rise in temperature in the cylinder).

However, as is shown in FIG. 10, since the small starter valve lift β is obtained by reducing the fast idle valve lift based on the maximum lift center position by the use of the variability of the variable valve train, in the event that the valve closing position of the inlet valve is positioned in the vicinity of the bottom dead center of the induction stroke period, a valve opening position of the inlet valve delays largely from the top dead center of the induction stroke period or the valve lift amount of the inlet valve becomes somewhat too small.

When the valve opening position of the inlet valve delays, there is formed a blank period like a period m shown as extending from closure of the inlet valve to opening of the same in FIG. 10, that is, a period when a vacuum or depression is formed in the cylinder. Because of this, there is caused a fear that oil is caused to enter the cylinder from the circumference of the piston due to the depression so produced in the cylinder. In addition, the valve lift amount of the inlet valve which is slightly too small tends to easily call for insufficiency of intake air by volume, leaving many problems in the engine. In addition, although it is considered to advance overall the valve lift for elimination of the time period m in FIG. 10 so as to position the valve opening position in the vicinity of the top dead center, as this occurs, the valve closing position results in a point lying forwards of the bottom dead center, whereby there is a period when a depression is formed within the cylinder.

As a countermeasure against the problem above, there is proposed a technique for filling the period when the depression is formed within the cylinder by the use of a separate approach as is shown in FIG. 11 in which the phase of an exhaust valve is delayed by a variable valve train of a variable phase type and the valve opening position of the inlet valve is advanced by increasing the valve lift amount of the small valve lift β.

By the use of the technique so proposed, the formation of depression is suppressed in an ensured fashion, and the valve lift amount is increased. As is shown in FIG. 11, however, since the starter valve lift β is set in such a way that the valve lift amount is increased based on the maximum lift center position, the valve closing position is delayed largely to a point in the area spreading further than the bottom dead center of the induction stroke period. This then causes a fundamental problem that the actual compression ratio within the cylinder is reduced. Moreover, since a period when the exhaust valve is opened and the inlet valve is closed is formed in an area spreading further than the top dead center of the induction stroke period, a behavior is generated in which combustion gases are retaken in from an initial combustion on, and combustion tends to become unstable easily, resulting in a fear that a misfire may take place. Because of this, conversely, there is also caused a fear that the startability of the engine is reduced. On top of that, the delay of the phase of the exhaust valve delays the opening of the exhaust valve, this also leading to a problem that the effect is eliminated of increasing the temperature of a catalyst for purifying exhaust gases of the engine.

In addition to the variable valve train having the construction in which the valve lift of the inlet valve is made to vary continuously from the maximum lift to the minimum lift based on the maximum lift center while narrowing the valve opening period, there is also known a variable valve train having a construction in which the valve lift of an inlet valve is made to vary continuously from a maximum valve lift to a minimum valve lift while advancing the advance angle and further narrowing a valve opening period. However, with the variable valve train having the construction described above, although valve characteristics matching running or operating conditions of the engine can be obtained, it becomes difficult due to its variability that a valve lift for a fast idle of a cold engine is compatible with a valve lift for starting the cold engine.

SUMMARY OF THE INVENTION

According to an aspect of the invention, there is provided an internal combustion engine including: a cam shaft, having an inlet cam for opening and closing an inlet valve; a variable valve train mechanism, configured to receive a cam displacement of the inlet cam so as to vary a driving output for driving the inlet valve continuously from a maximum valve lift to a minimum valve lift, while narrowing a valve opening period, so as to match the driving output with a running condition of the internal combustion engine; and a control part, configured to control the variable valve train mechanism so as to set a valve lift of the inlet valve to a starter valve lift when starting the internal combustion engine in a cold state, wherein the starter valve lift is formed so that a valve opening period of the inlet valve is set to encompass an overall area of an induction stroke period of the internal combustion engine from a top dead center to a bottom dead center of the induction stroke period.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, the invention will be described based on a first embodiment which is shown in FIGS. 1 to 6.

Figure 1:
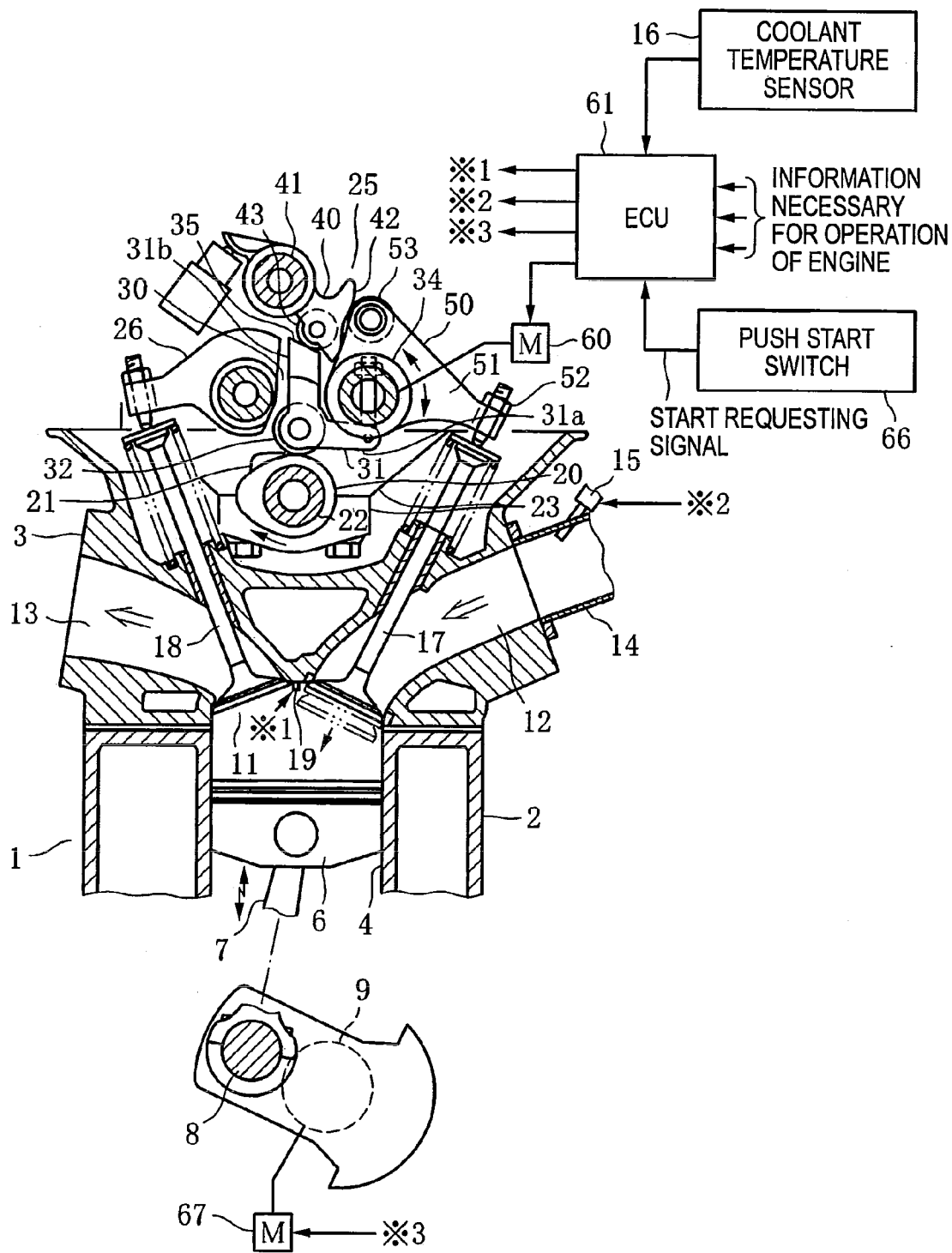
FIG. 1 is a drawing showing a schematic construction of an internal combustion engine according to a first embodiment of the invention together with a control system for controlling the internal combustion engine.
Figure 2:
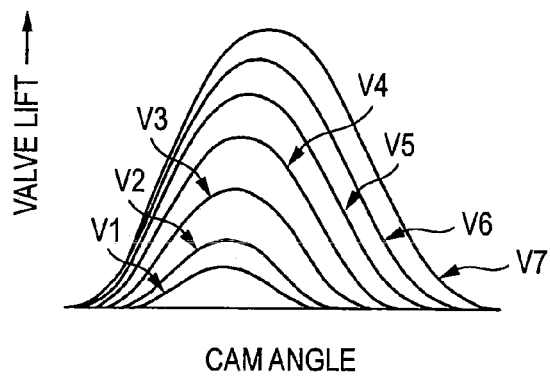
FIG. 2 is a diagram explaining characteristics of a variable valve train mounted on the engine.

FIG. 1 shows schematically part of a reciprocating SOHC engine 1 which is an internal combustion engine and a control system of the engine 1.

Firstly, the engine 1 will be described. In FIG. 1, reference numeral 2 denotes a cylinder block and reference numeral 3 denotes a cylinder head which is mounted on an upper portion of the cylinder block 2. Cylinders 4 (only part thereof being shown) are formed in the cylinder block 2 of these constituent components of the engine 1. A piston 6 is accommodated within the cylinder 4 so as to reciprocate therein. This piston 6 is connected to a crankshaft 9 which is provided at a lower portion of the cylinder block 2 via a connecting rod 7 and a crank pin 8.

A combustion chamber 11 is formed below a lower surface of the cylinder head 3. An inlet port 12 and an exhaust port 13 are formed on sides of the combustion chamber 11. A fuel injection valve 15 for injecting fuel is provided on an inlet manifold 14 which connects to the inlet port 12 of those two ports. In addition, an inlet valve 17 is provided in the inlet port 14, and an exhaust valve 18 is provided in the exhaust port 13. Additionally, a spark plug 19 is provided in a center of the combustion chamber 11. Further, a cam shaft 22 having both an inlet cam 20 and an exhaust cam 21 is provided rotatably at an upper portion of the cylinder head 3 via a holding member 23. The cam shaft 22 is such as to be driven by a shaft horsepower which is transmitted from the crankshaft 9.

A variable valve train 25 of an advance angle continuously variable lift type in which opening and closing timings and valve lift amount of the inlet valve 17 are made continuously variable is assembled to the inlet valve 17 of the two valves. In addition, a rocker arm 26 is assembled to the exhaust valve 18, which rocker arm 26 follows unconditionally a normal valve characteristic of the exhaust valve 18, that is, a cam displacement of the exhaust cam 21 so as to drive to open and close the exhaust valve 18.

Here, the variable valve train 25 will be described. The variable valve train 25 employs, for example, a construction which is made up of a combination of a center rocker arm 30 which is disposed directly above the inlet cam 20, a swing cam 40 which his disposed directly above the center rocker arm 30 and an inlet rocker arm 50 which is disposed on the inlet valve 17 side which lies adjacent to the swing cam 40.

Namely, the center rocker arm 30 is a component which receives the displacement of the inlet cam 20 so as to move vertically. Specifically, the center rocker arm 30 is configured so as to include for example an L-shaped arm portion 31 and a sliding roller 32 which is provided amid the same arm portion 31. Of these constituent components of the center rocker arm 30, the siding roller 32 is in rolling contact with a cam surface of the inlet cam 20. An arm end portion 31a of the arm portion 31 which extends horizontally is supported on a control shaft 34 (a control member) which is supported rotatably on an inlet valve 17 side of the cylinder head 3. By this configuration, a cam displacement of the inlet cam 20 is made to be transmitted to the upper swing cam 40 via the sliding roller 32 and further by a swinging displacement of the arm portion 31 which takes place about an end of the arm end portion 31a functioning as a fulcrum. In addition, when the control shaft 34 rotates to be displaced, the center rocker arm 30 is displaced in a direction which intersects an axis of the cam shaft 22 (advancing or delaying direction) while changing its rolling contact position with the inlet cam 20.

The swing cam 40 projects towards the rocker arm 50 side at one end portion thereof and is supported rotatably on a support shaft 41 at the other end portion. A cam surface 42 is formed on an end face of the one end portion so as to push the rocker arm 50. A sliding roller 43 is provided at a lower portion of the swing cam 40 so as to be brought into rolling contact with an inclined surface 35 formed at an end of an arm end portion 31b of the center rocker arm 30 which extends upwards. By this configuration, when the center rocker arm 30 is driven, the swing cam 40 swings on the support shaft 41 functioning as a fulcrum. In addition, when the rolling contact position of the center rocker arm 30 with the inlet cam 20 is changed by a rotational displacement of the control shaft 34, the posture of the swing cam 40 is changed (inclined).

The rocker arm 50 has an arm member 51 which rotates to displace the control shaft 30 as a rocker shaft. This arm member 51 has an adjusting screw portion 52 which pushes on an end of the inlet valve 17 at one end portion and a sliding roller 53 which is brought into rolling contact with the cam surface 42 of the swing cam 40 at the other end portion thereof. By this configuration, when the swing cam 40 swings, the cam surface 42 pushes or returns the sliding roller 53, whereby the rocker arm 50 swings on the control shaft 34 as a fulcrum, so as to open or close the inlet valve 17.

Here, in the cam surface 42, an upper side is formed as a base circle section which corresponds to a base circle of the inlet cam 20, and a lower side is formed as a lift section which is consecutive to the base circle section. By this configuration, when the sliding roller 32 of the center rocker arm 30 is displaced in an advancing direction or a delaying direction of the inlet cam 20 by a rotational displacement of the control shaft 34, the posture of the swing cam 40 is changed, and an area of the cam surface 42 on which the sliding roller 53 rolls is changed, whereby the ratio of the base circle section on which the sliding roller 53 swings to the lift section is changed. By the change of the ratio of the base circle section to the lift section, the valve lift amount of the inlet valve 17 is made to vary continuously from a low lift which is provided by a cam profile at a top of the inlet cam 20 to a high lift which is provided by an overall cam profile of the inlet cam 20 which extends from a top portion to a proximal end portion thereof. At the same time, opening and closing timings of the inlet valve 17 are made to vary so that the valve closing timing varies more largely than the valve opening timing.

Namely, a valve driving output specific to the variable valve train 25 is outputted from the variable valve train 25, by which valve driving output the inlet valve 17 is made to vary unconditionally and continuously from its maximum valve lift, for example, V7 to its minimum valve lift, for example, V1 while advancing the advance angle and further narrowing a valve opening period.

In addition, a driving part for driving the control shaft 34, for example, an electric motor 60 is connected to a controlling part, for example, an ECU 61 (for example, such as to be made up of a microcomputer). This ECU 61 is also connected to the fuel injection valve 15, the spark plug 19, a coolant temperature sensor 16 (a sensor for detecting the temperature of the engine) and the like. Information necessary for operation of the engine 1 such as ignition timings, fuel injection amounts, fuel injection timings and inlet valve control amounts which correspond to running conditions of the engine is set (mapped) in the ECU 61 in advance, whereby ignition timing, fuel injection amount, fuel injection timing, and valve lift amount and opening and closing timings of the inlet valve 17 are made to be controlled so as to match a running condition (represented by, for example, vehicle speed, engine speed, accelerator opening and the like) which is inputted from the ECU 61.

A starter for rotationally driving the crankshaft 9, for example, an electric motor 67 is connected to the ECU 61. Then, when a start request signal is outputted by a starter switch connected to the ECU 61, for example, a push starter switch 66 (a staring part) being operated to be on, the electric motor 67 is actuated so as to crank the engine 1, whereby the engine 1 is started with an ignition timing, a fuel injection amount and an injection timing which are suitable for start of the engine 1, as well as normal starting valve opening and closing timings (of the inlet valve).

In addition, a device is imparted to the ECU 61 for increasing the startability of the engine when it is in a cold state by the use of the variable valve train 25.

Here, when the engine 1 is started in the cold state, as has been described in the "Related Art" section, the ECU 61 sets a valve lift α which is suitable for a cold start in the inlet valve 17 by the use of the variable valve train 25. Then, when the start of the engine 1 is confirmed, the ECU 61 changes the valve lift to a valve lift β which is suitable for a fast idle in a cold state in the inlet valve 17 and continues to warm up the engine 1.

Figure 3:
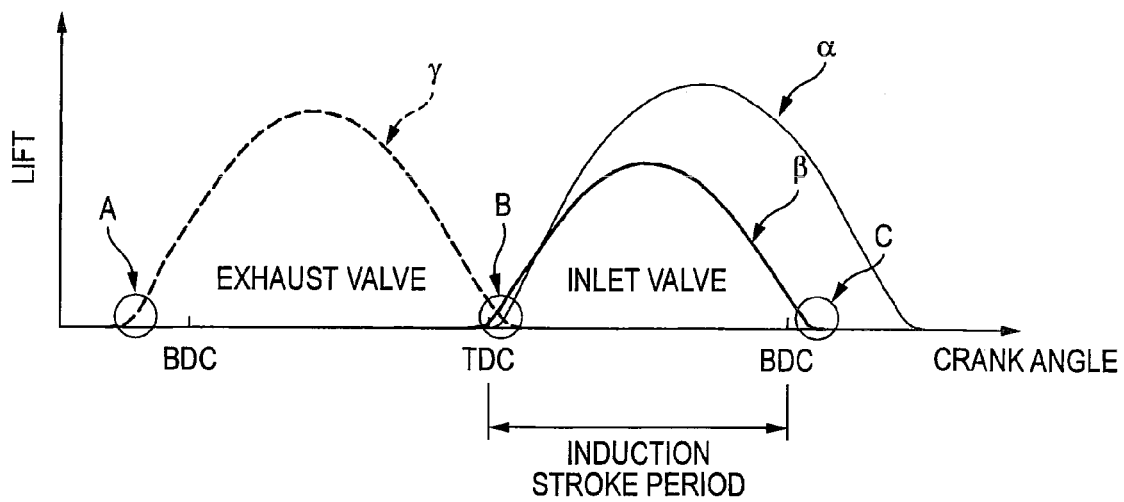
FIG. 3 is a diagram explaining a valve characteristic which is set for starting the internal combustion engine in a cold state.

As this occurs, as is shown in a diagram in FIG. 3, the valve lift α for a fast idle in a cold state is set similarly to that of the related art with a valve lift value which provides a wide valve opening period extending from a point near a top dead center to an area lying further than a bottom dead center of an induction stroke period.

On the other hand, a device is imparted to the valve lift β for a cold start. Namely, the valve lift β for a cold start is set by making use of a varying function which is specific to the variable valve train 25. To describe this specifically, by making use of a function of the variable valve train 25 illustrated in FIG. 2 to unconditionally narrow the advance angle and the valve opening period when the valve lift amount is reduced, as is shown in FIG. 3, the valve lift β for a cold start is set with a valve lift value resulting when the valve lift value is reduced from the valve lift value for a fast idle in a cold state to a value which enables the valve opening period of the inlet valve 17 to encompass an overall area extending from a point near to the top dead center to a point near to the bottom dead center of the induction stroke period. In particular, the valve lift β is made to overlap slightly a lift curve γ of the exhaust valve 18 in an area lying further than the top dead center by determining the valve opening position of the inlet valve 17 to be positioned in a position lying forwards of the top dead center position (before the top dead center) of the induction stroke period, and this is done as a measure for suppressing the discharge of exhaust gases which contain much unburnt fuel mixture.

When using the valve lift β for a cold start that is configured in the way described above, the startability of the engine in the cold state is improved.

Namely, a process of starting the engine 1 in the cold state will be described. When the push start switch 66 for example is operated to be on, the engine 1 is cranked by the electric motor 67 in conjunction therewith.

Figure 10:
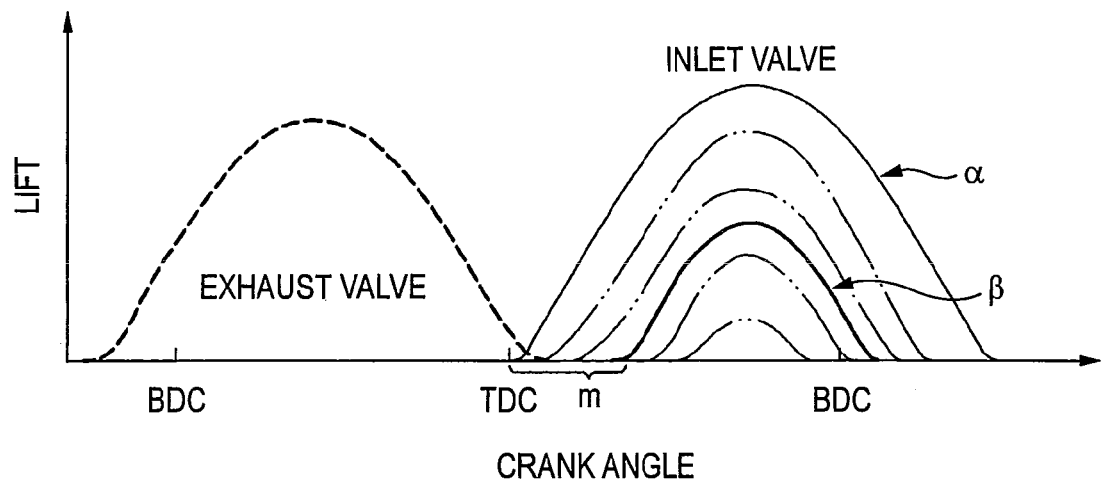
FIG. 10 is a diagram explaining a valve characteristic which is set for a conventional cold start of an engine.
Figure 11:
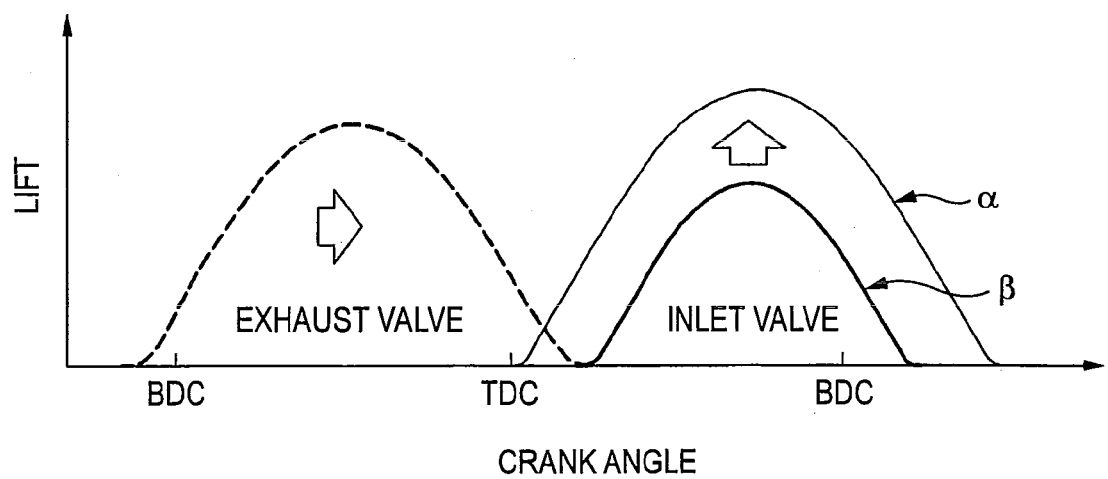
FIG. 11 is a diagram explaining a valve characteristic which is set for a conventional different cold state of the engine.

As this occurs, while the engine is in a standstill state, the variable valve train 25 is controlled to set the valve lift of the inlet valve 17 to the valve lift β for a cold start by the operation of the electric motor 60. Since it is realized that the valve opening period of the valve lift β for a cold start is set to extend over the overall area of the induction stroke period as is shown in FIG. 3 by the varying function of the variable valve train 25 which is specific thereto, intake air is taken in by the use of the overall area of the induction stroke period without generating a period like the period m in FIG. 10 where an unnecessary depression is produced within the cylinder and further without involving a delay in valve closing timing. On top of that, since the valve lift amount of the valve lift β is increased by setting the valve opening period to spread over the wide area, intake air is taken in sufficiently, so as to increase the actual compression ratio.

Namely, when the engine 1 is started in the cold state, an environment is formed in which fuel becomes most ignitable, whereby the engine 1 can be started quickly. In addition, when the continuation of complete combustion is confirmed by the ECU 61, the variable valve train 25 is controlled so that the valve lift is switched to the valve lift α for a fast idle in a cold state which is shown in FIG. 3, and the engine operating mode is shifted from the cold start to the warming-up operating mode.

Figure 4:
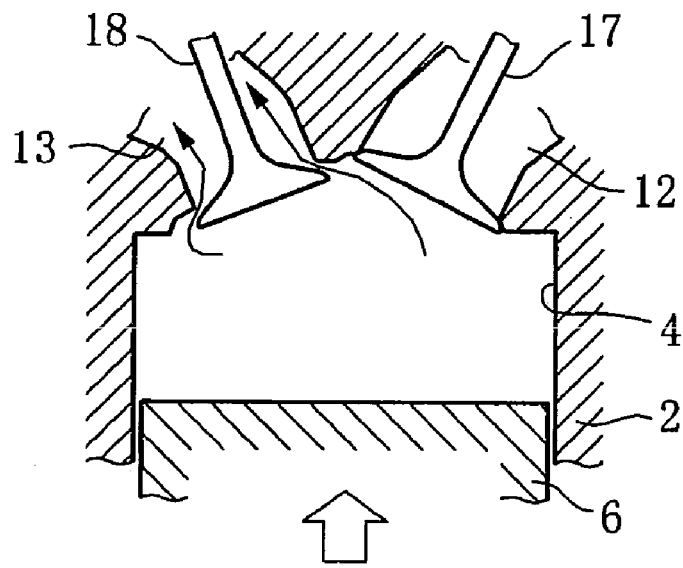
FIG. 4 is a sectional view explaining a state occurring within a cylinder at a period A in FIG. 3.

Consequently, by the use of the variable valve train 25 of advance angle continuously variable lift type which has the specific varying function, the engine 1 can be started well when it is attempted to in the cold state, thereby making it possible to obtain a high startability. Moreover, since the valve characteristics of the exhaust valve 18 do not have to be changed, there is no such situation that no delay is produced in opening the exhaust valve 18 as is shown at a period A in FIG. 3, and as shown in FIG. 4 which illustrates a behavior at the period A, an early opening of the exhaust valve 18 is not interrupted, and therefore, the temperature rising effect of the catalyst is not eliminated.

Figure 5:
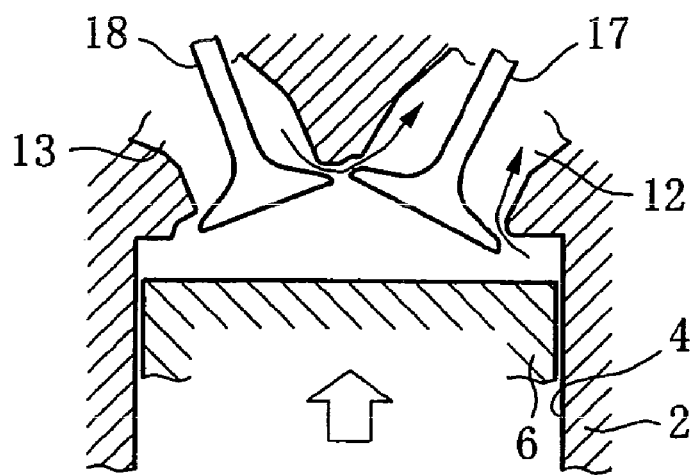
FIG. 5 is a sectional view explaining a state occurring within the cylinder at a period B in FIG. 3.
Figure 6:
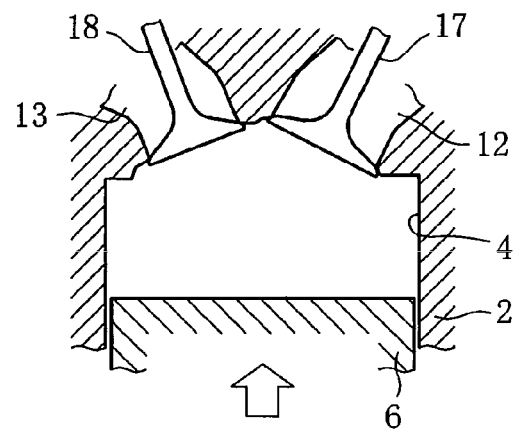
FIG. 6 is a sectional view explaining a state occurring within the cylinder at a period C in FIG. 3.

In particular, by the valve opening position of the valve lift β for a cold start being set to be located at a point lying forwards of the top dead center position of the induction stroke period, in the overlap period B in FIG. 3, exhaust gases containing much unburned fuel mixture produced in a latter half portion of an exhaust stroke are blown back into the inlet port as is shown in FIG. 5. Then, in a subsequent stroke, since the exhaust gases are retaken into an interior of the cylinder for combustion, the discharge of exhaust gases containing much unburnt fuel mixture can be suppressed when the engine is started in the cold state. Further, since an unnecessary depression is not produced within the cylinder and the pumping loss becomes small, the cranking speed is increased, and on top of that, the oil loss via the piston ring is suppressed, the starting of the engine being facilitated.

Moreover, since the valve closing position of the starter valve lift β becomes such that as is illustrated at a period C in FIG. 3, the inlet valve 17 comes to close as it approaches the bottom dead center by such an extent that the valve opening position is advanced, the actual compression ratio within the cylinder is increased, and fuel gets easy to be vaporized (due to a temperature rise within the cylinder), whereby the engine gets easier to be started.

Figure 7:
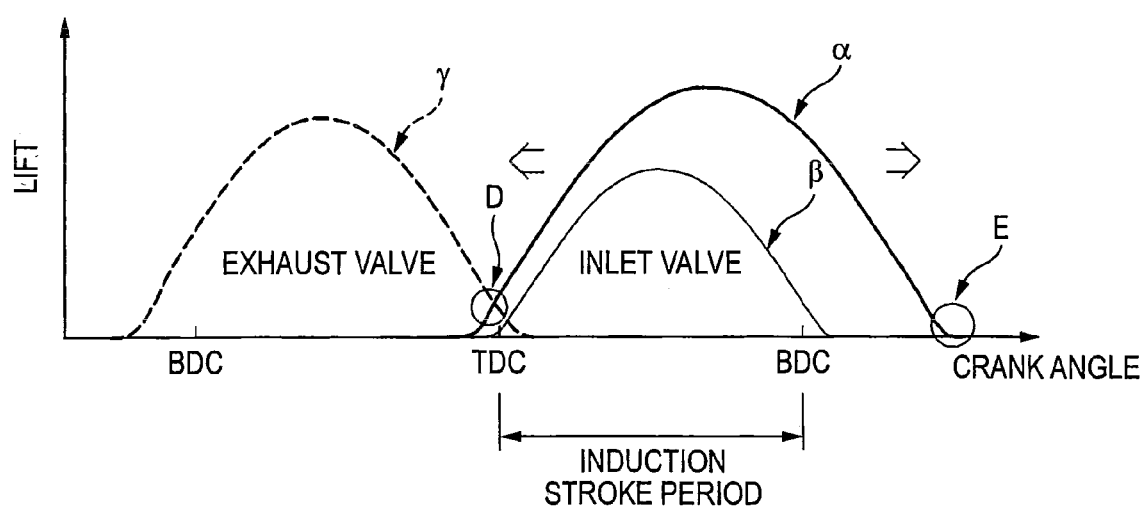
FIG. 7 is a diagram explaining a valve characteristic which is set for a fast idle when the internal combustion engine is in the cold state, the valve characteristic constituting a crucial part of a second embodiment of the invention.
Figure 8:
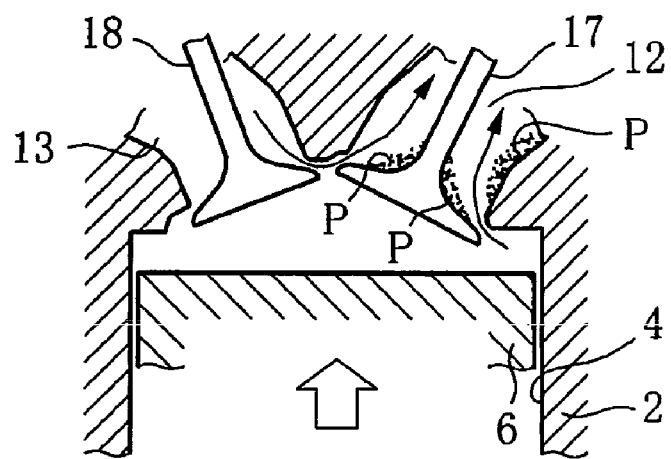
FIG. 8 is a sectional view explaining a state occurring within the cylinder at a period D in FIG. 7.
Figure 9:
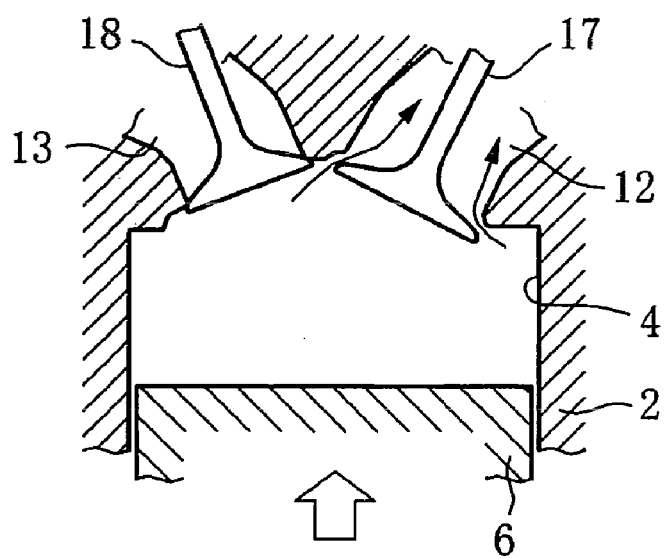
FIG. 9 is a sectional view explaining a state occurring within the cylinder at a period E in FIG. 7.

FIGS. 7 to 9 show a second embodiment of the invention.

This embodiment is a modified example to the first embodiment, which is a device imparted to the large valve lift α for fast idle which is used for the fast idle in the cold state which follows the cold start, which device is such as to suppress the discharge of exhaust gases containing much unburnt fuel mixture.

Namely, a lift curve of a valve opening period having a valve opening position which lies forwards of a top dead center of an induction stroke period is adopted in a valve lift α for a fast idle in a cold state. In particular, a setting is used in a valve lift α in which the valve opening position of an inlet valve 17 is advanced further forwards from a top dead center of an induction stroke period than the valve opening position of the inlet valve 17 used for the cold start, and a valve closing position of the inlet valve 17 is delayed to a point which lies beyond a bottom dead center of the induction stroke period by such an extent that the valve opening position is so advanced.

By the valve opening position being set in the way described above, even in the stage of fast idle in the cold state, exhaust gases containing much unburnt fuel mixture which are produced in a latter half of an exhaust stroke can be blown back into an inlet port 12 so as to be retaken into the interior of a cylinder in a subsequent stroke for combustion. Namely, the discharge of exhaust gases containing much unburnt fuel mixture can be suppressed also in the cold fast idle which follows the cold start.

In particular, by the valve opening position of the inlet valve 17 in the valve lift α for fast idle in the cold state being advanced further forwards from the top dead center of the induction stroke period than the valve opening position of the inlet valve 17 used for the cold start as is shown in FIG. 7, the pushing back of exhaust gases containing much unburnt fuel mixture into the inlet port 12 becomes quite strong due to an overlap period of an exhaust valve 18 and the inlet valve 17 being larger than that used for the cold start and further a rise in vacuum in an inlet manifold and the pushing out effect of a piston 6 acting largely. Because of this, during an overlap period which is indicated by reference character D in FIG. 7, fuel P adhering to portions of the inlet valve 17 and a wall surface of the inlet port 12 can be blown off to scatter in the inlet port 12 so that the fuel P so scattering in the inlet port 12 can be burnt in a subsequent stroke, thereby making it possible to suppress further the discharge of unburnt fuel mixture.

In addition to this, by the valve closing position of the inlet valve 17 being delayed to the point lying beyond the bottom dead center of the induction stroke period, as shown in FIG. 9, air-fuel mixture is strongly blown back into the inlet port in a compression stroke. The vaporization or mixing of fuel taking the form of droplets within the fuel mixture is promoted by the fact that the air-fuel mixture that is to be retaken into the cylinder has been warmed up by the exhaust valve 18, the wall surface of the combustion chamber 11, the cylinder 4 and the piston 6 in the previous stroke and further by time spent and flowing action carried out until a subsequent stroke. In addition to this, the vaporization and mixing of fuel that is injected into the inlet port in the subsequent stroke is also promoted.

Therefore, in the second embodiment, the stable cold fast idle can be obtained while suppressing the discharge of unburnt fuel mixture. Moreover, since the actual compression ratio is reduced and the mixing of air and fuel is improved, there occurs no rise in combustion temperature that would otherwise occur in conjunction with the mixture being made lean locally, and the discharge of oxides of nitrogen is also suppressed.

In FIGS. 7 to 9, however, like reference numerals were imparted to like portions to those of the first embodiment, so as to omit the description thereof.

In addition, the invention is not limited to the embodiments described heretofore and may be modified variously without departing from the spirit and scope of the invention.

What is claimed is:

1. An internal combustion engine, comprising:
   a cam shaft, having an inlet cam for opening and closing an inlet valve;
   a variable valve train mechanism, configured to receive a cam displacement of the inlet cam so as to vary a driving output for driving the inlet valve continuously from a maximum valve lift to a minimum valve lift, while narrowing a valve opening period, so as to match the driving output with a running condition of the internal combustion engine; and
   a control part, configured to control the variable valve train mechanism so as to set a valve lift of the inlet valve to a starter valve lift when starting the internal combustion engine in a cold state, and to a fast idle valve lift thereafter, wherein
   the starter valve lift is formed so that a valve opening period of the inlet valve is set to encompass an overall area of an induction stroke period of the internal combustion engine from a top dead center to a bottom dead center of the induction stroke period, and
   an amount of maximum valve lift during the starter valve lift is smaller than an amount of maximum valve lift during the fast idle valve lift.

2. An internal combustion engine as set forth in claim 1, wherein
   a valve opening position of the starter valve lift is determined to be positioned in a position lying forwards of an upper dead center position of the induction stroke period.

3. An internal combustion engine as set forth in claim 1, wherein:
   the control part sets the valve lift of the inlet valve to the fast idle valve lift whose valve opening period is longer than that of the starter valve lift at the time of a fast idle which follows a cold start of the internal combustion engine; and in the fast idle valve lift, a valve opening position of the inlet valve is determined to be positioned in a position lying forwards of the top dead center of the induction stroke period.

4. An internal combustion engine as set forth in claim 3, wherein in the fast idle valve lift, the valve opening position of the inlet valve is advanced further forwards of the top dead center position of the induction stroke period than the position where the valve opening position was positioned for the cold start, and a valve closing position of the inlet valve is delayed to a point lying beyond a bottom dead center position of the induction stroke period.

5. An internal combustion engine as set forth in claim 4, wherein a period, which the valve opening period of the inlet valve and an valve opening period of an exhaust valve are overlapped, is lengthened when the starter valve lift is sifted to the fast idle valve lift.

6. An internal combustion engine, comprising:

a cam shaft, having an inlet cam for opening and closing an inlet valve;

a variable valve train mechanism, configured to receive a cam displacement of the inlet cam so as to vary a driving output for driving the inlet valve continuously from a maximum valve lift to a minimum valve lift, while narrowing a valve opening period, so as to match the driving output with a running condition of the internal combustion engine; and a control part, configured to control the variable valve train mechanism so as to set a valve lift of the inlet valve to a starter valve lift when starting the internal combustion engine in a cold state, wherein the starter valve lift is formed so that a valve opening period of the inlet valve is set to encompass an overall area of an induction stroke period of the internal combustion engine from a top dead center to a bottom dead center of the induction stroke period, the control part sets the valve lift of the inlet valve to a fast idle valve lift whose valve opening period is longer than that of the starter valve lift at the time of a fast idle which follows a cold start of the internal combustion engine; and in the fast idle valve lift, a valve opening position of the inlet valve is determined to be positioned in a position lying forwards of the top dead center of the induction stroke period.

7. An internal combustion engine as set forth in claim 6, wherein in the fast idle valve lift, the valve opening position of the inlet valve is advanced further forwards of the top dead center position of the induction stroke period than the position where the valve opening position was positioned for the cold start, and a valve closing position of the inlet valve is delayed to a point lying beyond a bottom dead center position of the induction stroke period.

8. An internal combustion engine as set forth in claim 6, wherein a period, which the valve opening period of the inlet valve and an valve opening period of an exhaust valve are overlapped, is lengthened when the starter valve lift is sifted to the fast idle valve lift.

* * * * *